US010057213B2

(12) United States Patent
Jäger

(10) Patent No.: US 10,057,213 B2
(45) Date of Patent: *Aug. 21, 2018

(54) EXAMINING AND CONTROLLING IPV6 EXTENSION HEADERS

(71) Applicant: Fortinet, Inc., Sunnyvale, CA (US)

(72) Inventor: Thorsten Jäger, Zurich (TO)

(73) Assignee: Fortinet, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/701,184

(22) Filed: Sep. 11, 2017

(65) Prior Publication Data

US 2017/0374031 A1 Dec. 28, 2017

Related U.S. Application Data

(60) Continuation of application No. 15/396,137, filed on Dec. 30, 2016, now Pat. No. 9,769,119, which is a continuation of application No. 15/006,051, filed on Jan. 25, 2016, now Pat. No. 9,584,478, which is a division of application No. 14/145,568, filed on Dec. 31, 2013, now Pat. No. 9,300,632.

(51) Int. Cl.
*H04L 29/06* (2006.01)

(52) U.S. Cl.
CPC ........ *H04L 63/0236* (2013.01); *H04L 63/164* (2013.01)

(58) Field of Classification Search
CPC ..... H04L 63/00; H04L 63/02; H04L 63/0227; H04L 63/0236; H04L 63/14; H04L 63/1408; H04L 63/16; H04L 63/164; H04L 29/12915

USPC .......................................................... 726/13
See application file for complete search history.

(56) References Cited

U.S. PATENT DOCUMENTS

| 8,935,785 | B2 | 1/2015 | Pandrangi |
| 9,300,632 | B2 | 3/2016 | Jäger |
| 9,584,478 | B2 | 2/2017 | Jäger |
| 9,769,119 | B2 | 9/2017 | Jäger |
| 2003/0185236 | A1 | 10/2003 | Asano |
| 2005/0102504 | A1 | 5/2005 | Le et al. |

(Continued)

OTHER PUBLICATIONS

Final Rejection for U.S. Appl. No. 14/145,568 dated Sep. 23, 2015.

(Continued)

*Primary Examiner* — Yogesh Paliwal
(74) *Attorney, Agent, or Firm* — Hamilton, DeSanctis & Cha LLP

(57) ABSTRACT

Methods and systems for selectively blocking, allowing and/or reformatting IPv6 headers by traversing devices are provided. According to one embodiment, reputation information regarding observed senders of Internet Protocol (IP) version 6 (IPv6) packets and packet fragments is maintained by a traversing device based on conformity or nonconformity of extension headers contained within the IPv6 packets with respect to a set of security checks performed by the traversing device. When an IPv6 packet or packet fragment is received from a particular source IP address indicated by the reputation information to be associated with one or more nonconformity issues, then dropping, rate limiting or quarantining, by the traversing device, the IPv6 packet or the packet fragment.

18 Claims, 4 Drawing Sheets

(56) References Cited

U.S. PATENT DOCUMENTS

| | | |
|---|---|---|
| 2010/0054133 A1 | 3/2010 | Schuringa |
| 2012/0047573 A1* | 2/2012 | Duncan ............. H04L 29/12915 |
| | | 726/13 |
| 2012/0069845 A1 | 3/2012 | Carney et al. |
| 2012/0079592 A1* | 3/2012 | Pandrangi ............... H04L 47/10 |
| | | 726/22 |
| 2015/0188885 A1 | 7/2015 | Jäger |
| 2016/0164834 A1 | 6/2016 | Jäger |
| 2017/0111319 A1 | 4/2017 | Jäger |

OTHER PUBLICATIONS

Non-Final Rejection for U.S. Appl. No. 14/145,568 dated Jan. 28, 2015.
Notice of Allowance for U.S. Appl. No. 14/145,568 dated Feb. 18, 2016.
Non-Final Rejection for U.S. Appl. No. 15/006,051 dated Jul. 28, 2016.
Notice of Allowance for U.S. Appl. No. 15/006,051 dated Dec. 7, 2016.
Non-Final Rejection for U.S. Appl. No. 15/396,137 dated Feb. 7, 2017.
Notice of Allowance for U.S. Appl. No. 15/396,137 dated Aug. 31, 2017.

* cited by examiner

EXAMINING AND CONTROLLING IPV6 EXTENSION HEADERS

CROSS-REFERENCE TO RELATED APPLICATIONS

This application is a continuation of U.S. patent application Ser. No. 15/396,137, filed Dec. 30, 2016, which is a continuation of U.S. patent application Ser. No. 15/006,051, filed Jan. 25, 2016, now U.S. Pat. No. 9,584,478, which is a divisional of U.S. patent application Ser. No. 14/145,568, filed Dec. 31, 2013, now U.S. Pat. No. 9,300,632, all of which are hereby incorporated by reference in their entirety for all purposes.

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright © 2013-2017, Fortinet, Inc.

BACKGROUND

Field

Embodiments of the present invention generally relate to computer security and computer network security. In particular, embodiments of the present invention relate to enhancement of traversing devices to allow more control over IPv6 extension headers.

Description of the Related Art

FIG. 1 conceptually illustrates the format of an Internet Protocol (IP) version 6 (IPv6) packet 100. As described in "Internet Protocol, Version 6 (IPv6) Specification," Request for Comments 2460, December 1998 (RFC 2460), which is hereby incorporated by reference in its entirety for all purposes, an IPv6 packet 100 includes (i) a header comprising two general portions—a 40 byte fixed portion 110, including various fields; and a variable extension header portion 120 and (ii) a data or payload portion 130.

As a result of the variable nature of extension header portion 120, which may carry zero, one or more extension headers, each identified by the next header field of the preceding header, various security concerns are raised; however, RFC 2460 indicates the extension headers are not to be examined or processed by nodes other than those identified by the destination address field.

SUMMARY

Methods and systems are described for selectively blocking, allowing and/or reformatting IPv6 headers by traversing devices. According to one embodiment, reputation information regarding observed senders of Internet Protocol (IP) version 6 (IPv6) packets and packet fragments is maintained by a traversing device based on conformity or nonconformity of extension headers contained within the IPv6 packets with respect to a set of security checks performed by the traversing device. When an IPv6 packet or packet fragment is received from a particular source IP address indicated by the reputation information to be associated with one or more nonconformity issues, then dropping, rate limiting or quarantining, by the traversing device, the IPv6 packet or the packet fragment.

Other features of embodiments of the present invention will be apparent from the accompanying drawings and from the detailed description that follows.

BRIEF DESCRIPTION OF THE DRAWINGS

Embodiments of the present invention are illustrated by way of example, and not by way of limitation, in the figures of the accompanying drawings and in which like reference numerals refer to similar elements and in which.

DETAILED DESCRIPTION

Figure 1:
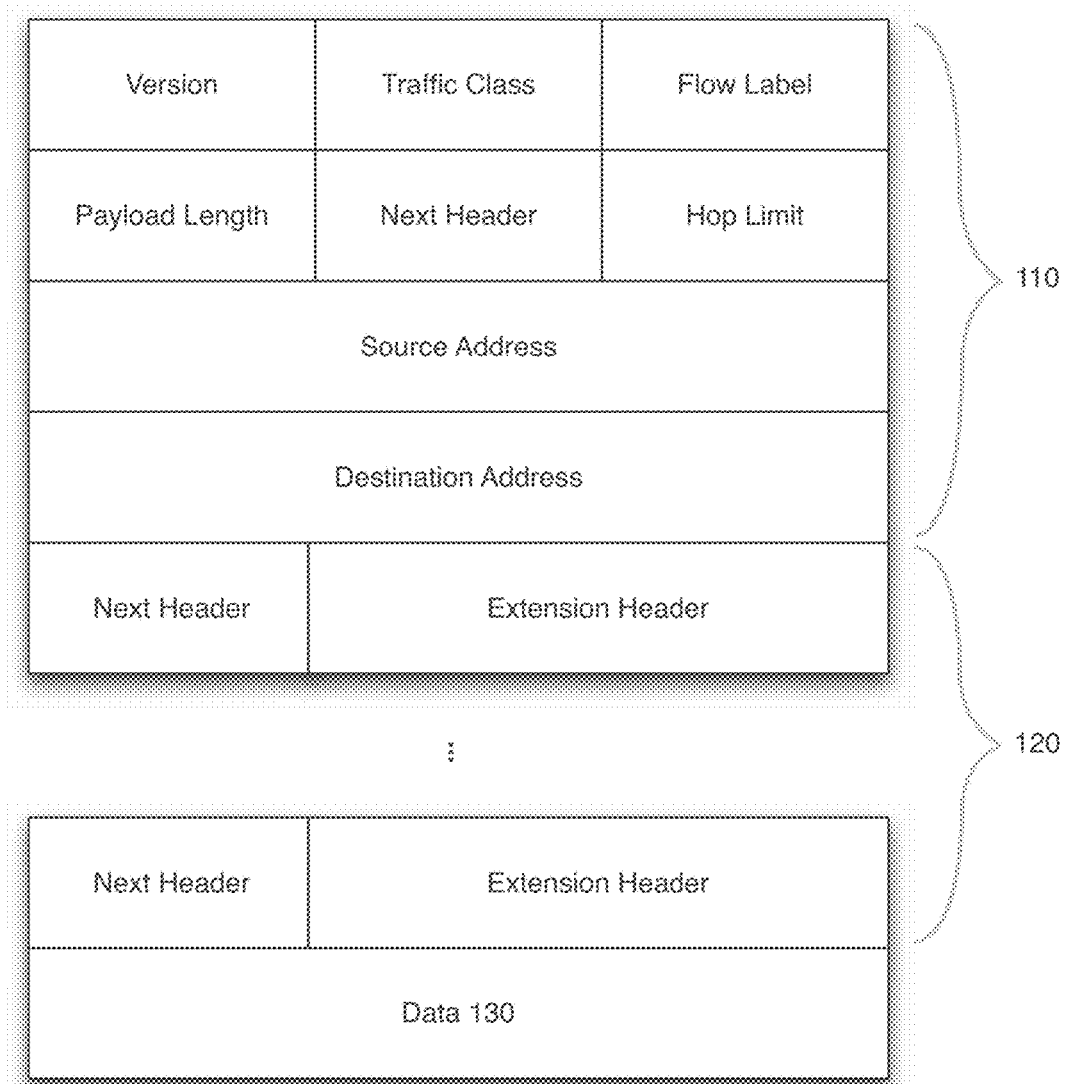
FIG. 1 conceptually illustrates the format of an IPv6 packet.

Methods and systems are described for selectively blocking, allowing and/or reformatting IPv6 headers by traversing devices. Because IPv6 extension headers are not well defined and can theoretically be of infinite size, they may be misused to crash traversing devices (e.g., routers, firewalls, network security appliances, unified threat management (UTM) devices, network gateways or switches). Such misuse may include fuzzing attacks, overflow attacks, information smuggling and the like. According to one embodiment, a traversing device examines IPv6 extension headers in packets or packet fragments and if certain security criteria are not satisfied then the traversing device may modify the IPv6 header before allowing the packet or packet fragment to proceed to its intended destination or block the packet or packet fragment. Two other RFCs are relevant to the discussion contained herein: (i) "IPv6 Transition/Coexistence Security Considerations," Request for Comments 4942, September 2007 (RFC 4942) and (ii) "A Uniform Format for IPv6 Extension Headers," Request for Comments 6564, April 2012 (RFC 6564). Both of RFC 4942 and RFC 6564 are hereby incorporated by reference in their entirety for all purposes.

Importantly, although various embodiments of IPv6 header firewalling functionality are discussed in the context of traversing devices in an enterprise network, they are equally applicable to other virtual or physical network devices or appliances operable within a data center, service provider environment and the like.

In the following description, numerous specific details are set forth in order to provide a thorough understanding of embodiments of the present invention. It will be apparent, however, to one skilled in the art that embodiments of the present invention may be practiced without some of these specific details. In other instances, well-known structures and devices are shown in block diagram form.

Embodiments of the present invention include various steps, which will be described below. The steps may be performed by hardware components or may be embodied in machine-executable instructions, which may be used to cause a general-purpose or special-purpose processor programmed with the instructions to perform the steps. Alternatively, the steps may be performed by a combination of hardware, software, firmware and/or by human operators.

Embodiments of the present invention may be provided as a computer program product, which may include a machine-readable medium having stored thereon instructions, which may be used to program a computer (or other electronic devices) to perform a process. The machine-readable medium may include, but is not limited to, floppy diskettes, optical disks, compact disc read-only memories (CD-ROMs), and magneto-optical disks, ROMs, random access memories (RAMs), erasable programmable read-only memories (EPROMs), electrically erasable programmable read-only memories (EEPROMs), magnetic or optical cards, flash memory, or other type of media/machine-readable medium suitable for storing electronic instructions. Moreover, embodiments of the present invention may also be downloaded as a computer program product, wherein the program may be transferred from a remote computer to a requesting computer by way of data signals embodied in a carrier wave or other propagation medium via a communication link (e.g., a modem or network connection).

Terminology

Brief definitions of terms used throughout this application are given below.

The terms "connected" or "coupled" and related terms are used in an operational sense and are not necessarily limited to a direct connection or coupling.

The term "client" generally refers to an application, program, process or device in a client/server relationship that requests information or services from another program, process or device (a server) on a network. Importantly, the terms "client" and "server" are relative since an application may be a client to one application but a server to another. The term "client" also encompasses software that makes the connection between a requesting application, program, process or device to a server possible, such as an FTP client.

The phrases "in one embodiment," "according to one embodiment," and the like generally mean the particular feature, structure, or characteristic following the phrase is included in at least one embodiment of the present invention, and may be included in more than one embodiment of the present invention. Importantly, such phases do not necessarily refer to the same embodiment.

The phrases "in one embodiment," "according to one embodiment," and the like generally mean the particular feature, structure, or characteristic following the phrase is included in at least one embodiment of the present invention, and may be included in more than one embodiment of the present invention. Importantly, such phases do not necessarily refer to the same embodiment.

The phrase "traversing device" broadly and generally refers to any network device through which packets flow. Non-limiting examples of traversing devices include routers, firewalls, network security appliances, unified threat management (UTM) devices, network gateways and switches. Such traversing devices can be implemented completely in software, completely in hardware, or as a combination of the two. Depending on the particular implementation, traversing devices can operate at any of one or more levels of the Open System Interconnection (OSI) reference model from application protocols to low-level signaling.

If the specification states a component or feature "may", "can", "could", or "might" be included or have a characteristic, that particular component or feature is not required to be included or have the characteristic.

The term "responsive" includes completely or partially responsive.

The term "server" generally refers to an application, program, process or device in a client/server relationship that responds to requests for information or services by another program, process or device (a server) on a network. The term "server" also encompasses software that makes the act of serving information or providing services possible.

Overview

One or more embodiments of the present invention may include combinations of various of the following features:
1. Pre-processing headers of IPv6 packets or packet fragments to reformat them (e.g., normalize or otherwise bring the extension headers into a recommended order by a normalization engine) into a desired format
2. Performing one or more security checks on the headers by an IPv6 extension header security engine
3. Performing appropriate countermeasures (e.g., block, allow or modify the offending packet) by a countermeasure engine
4. Dropping or rate limiting a packet and/or quarantine packets received from a particular source IP address that is misusing IPv6 extension headers (e.g., IPv6-header reputation based on packet conformity)
5. Passing the packet, but taking out and/or inserting specified extension headers
6. Sending an ICMPv6 error code back to the sender of the packet at issue.
7. Sending a packet in question to an intrusion prevention system (IPS) for deeper inspection to potentially reveal a Denial of Service (DoS) or Distributed DoS (DDoS) attack, for example As too many packets or packets of excessive size may be problematic for infrastructure devices, according to one embodiment of the present invention, a traversing device may limit the number of IPv6 extension headers in a particular packet or packet fragment. The number may be predefined and/or configurable and may be adjusted based on an application and/or protocol with which the packet is associated.

According to one embodiment, examination and control is applicable to both packets and fragments. That is, with respect to application of security checks relating to IPV6 extension headers, the traversing device does not differentiate between packets and packet fragments—thereby precluding potential bypass of the security countermeasures by fragments.

Figure 2:
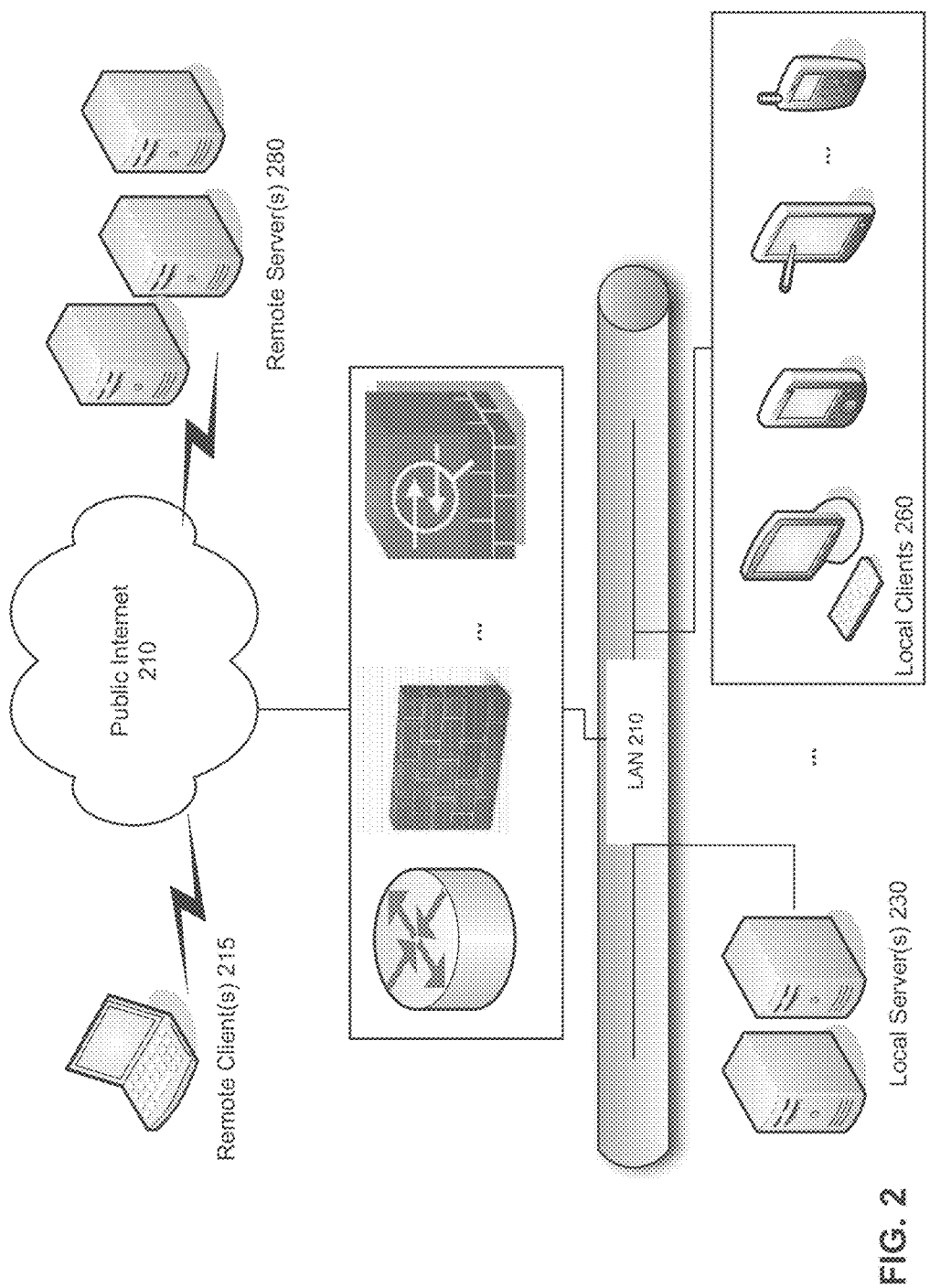
FIG. 2 is a block diagram conceptually illustrating a simplified network architecture in which embodiments of the present invention may be employed.

FIG. 2 is a block diagram conceptually illustrating a simplified network architecture in which embodiments of the present invention may be employed. In this simple example, one or more remote clients 215 are coupled in communication with a local area network (LAN) 210 via the public Internet 200 and one or more traversing devices 105 (e.g., routers, firewalls, network security appliances, unified threat management (UTM) devices, network gateways and switches).

In the simplified network architecture of FIG. 2, LAN 210 includes one or more local servers 230 and one or more local clients 220. In a real-world scenario, LAN 210 would likely include various other networked devices, such as network attached storage and printers (not shown). Similarly, traversing devices 205 would likely also be coupled to one or more of an email server, a web server and a domain name server (DNS) (not shown). In the context of the present example, local clients 220 may exchange IPv6 packets with remote servers 280 via traversing devices 205 and remote clients 215 may exchange IPv6 packets with local servers 230 via traversing devices 205. In one embodiment, one or more of traversing devices 205 incorporate various novel IPv6 examination and control methodologies in relation to IPv6 extension headers that are described further below.

Figure 3:
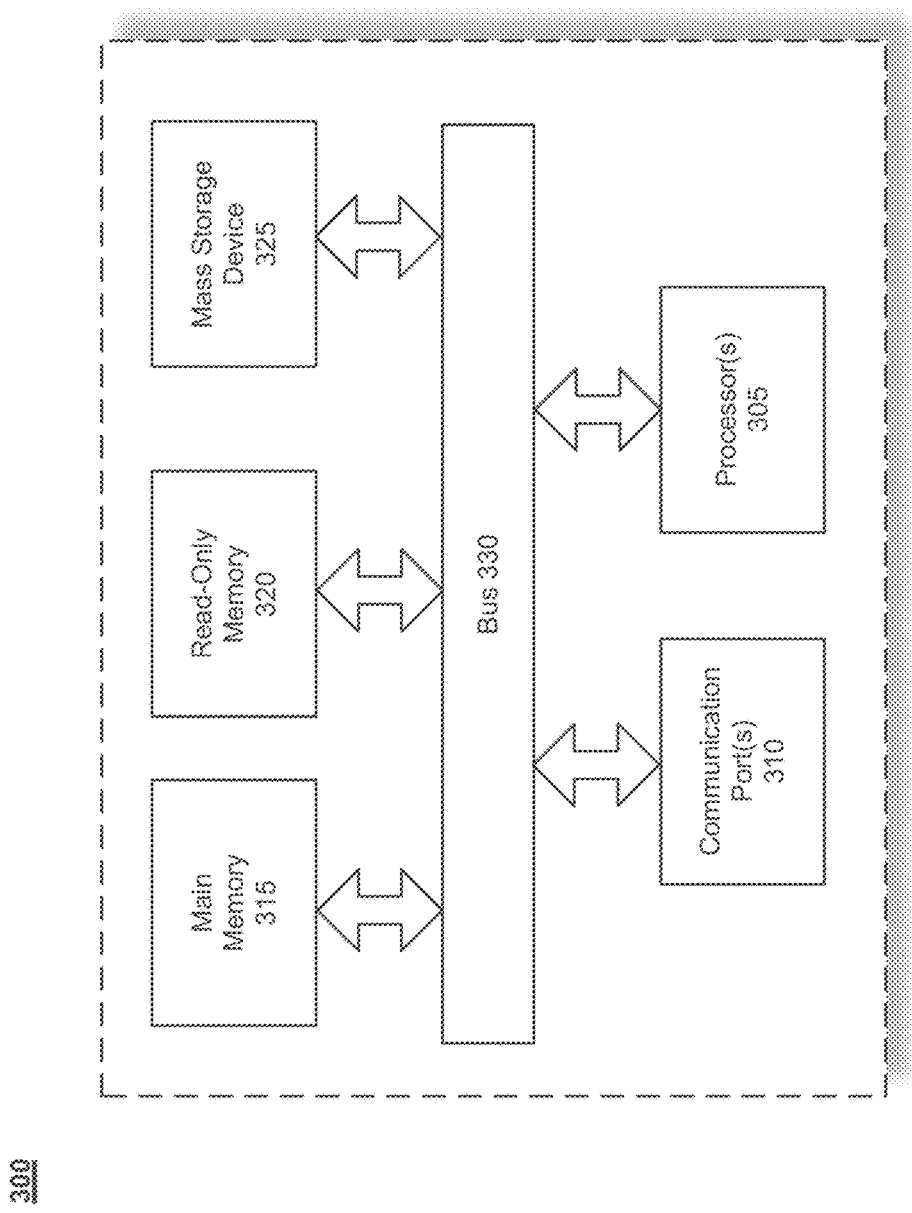
FIG. 3 is an example of a computer system with which embodiments of the present invention may be utilized.

FIG. 3 is an example of a computer system with which embodiments of the present invention may be utilized. The computer system 300 may represent or form a part of a traversing device, a data storage device, a server and/or other network devices. As shown, computer system 300 includes a bus 330, a processor 305, communication port 310, a main memory 315, a removable storage media 340, a read only memory 320 and a mass storage 325. A person skilled in the art will appreciate that computer system 300 may include more than one processor and communication ports.

Examples of processor 305 include, but are not limited to, an Intel® Itanium® or Itanium 2 processor(s), or AMD® Opteron® or Athlon MP® processor(s), Motorola® lines of processors, FortiSOC™ system on a chip processors or other future processors. In one embodiment, processor 305 may execute software representing one or more of an IPv6 packet header normalization engine, a security check engine and a countermeasure engine to perform the packet header examination and control processing described herein.

Communication port 310 can be any of an RS-232 port for use with a modem based dialup connection, a 10/100 Ethernet port, a Gigabit or 10 Gigabit port using copper or fiber, a serial port, a parallel port, or other existing or future ports. Communication port 310 may be chosen depending on a network, such a Local Area Network (LAN), Wide Area Network (WAN), or any network to which computer system 300 connects.

Memory 315 can be Random Access Memory (RAM), or any other dynamic storage device commonly known in the art. Read only memory 320 can be any static storage device(s) such as, but not limited to, a Programmable Read Only Memory (PROM) chips for storing static information such as start-up or BIOS instructions for processor 305.

Mass storage 325 may be any current or future mass storage solution, which can be used to store information and/or instructions. Exemplary mass storage solutions include, but are not limited to, Parallel Advanced Technology Attachment (PATA) or Serial Advanced Technology Attachment (SATA) hard disk drives or solid-state drives (internal or external, e.g., having Universal Serial Bus (USB) and/or Firewire interfaces), such as those available from Seagate (e.g., the Seagate Barracuda 7200 family) or Hitachi (e.g., the Hitachi Deskstar 7K1000), one or more optical discs, Redundant Array of Independent Disks (RAID) storage, such as an array of disks (e.g., SATA arrays), available from various vendors including Dot Hill Systems Corp., LaCie, Nexsan Technologies, Inc. and Enhance Technology, Inc.

Bus 330 communicatively couples processor(s) 305 with the other memory, storage and communication blocks. Bus 330 can be, such as a Peripheral Component Interconnect (PCI)/PCI Extended (PCI-X) bus, Small Computer System Interface (SCSI), USB or the like, for connecting expansion cards, drives and other subsystems as well as other buses, such a front side bus (FSB), which connects processor 305 to system memory.

Optionally, operator and administrative interfaces, such as a display, keyboard, and a cursor control device, may also be coupled to bus 330 to support direct operator interaction with computer system 300. Other operator and administrative interfaces can be provided through network connections connected through communication port 310.

Removable storage media 340 can be any kind of external hard-drives, floppy drives, IOMEGA® Zip Drives, Compact Disc-Read Only Memory (CD-ROM), Compact Disc-Re-Writable (CD-RW), Digital Video Disk-Read Only Memory (DVD-ROM).

Components described above are meant only to exemplify various possibilities. In no way should the aforementioned exemplary computer system limit the scope of the present disclosure.

Figure 4:
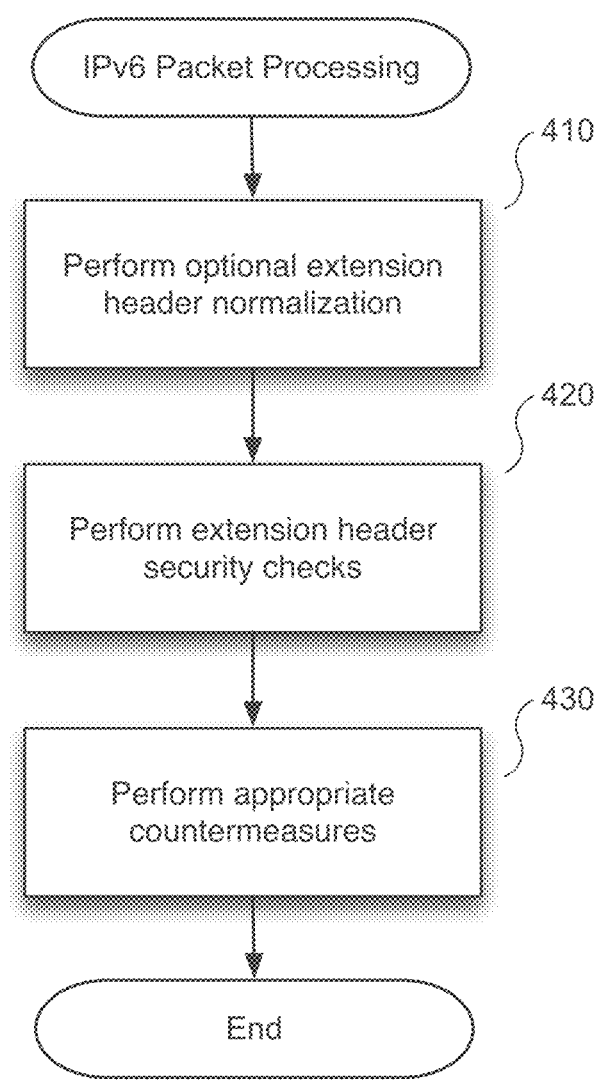
FIG. 4 is a flow diagram illustrating packet or packet fragment processing in accordance with an embodiment of the present invention.

FIG. 4 is a flow diagram illustrating packet or packet fragment processing in accordance with an embodiment of the present invention. According to one embodiment, upon receipt of a packet that has been identified as an IPv6 packet by a traversing device, extended header processing, security checks and countermeasures are performed in addition to other content filtering or processing that may be typically performed by the traversing device. In general, it may be desirable for traversing devices selectively control (e.g., block or pass) certain IPv6 extension headers. It may further be desirable to limit the number of extension headers to that which is reasonable in the context of the application, protocols and/or user activities associated with the packet at issue. It may also be desirable to only allow certain types or well-known extension headers (e.g., those defined by RFCs published at the time) and those that conform to specifications (e.g., only allow one fragment extension header). Not all network administrators will agree on the correct approach for handling IPv6 extension headers. As such, for purposes of the present discussion, a flexible approach is provided in which a network administrator may be able to selectively enable/disable various security checks.

At block 410, optional extension header normalization is performed. In one embodiment, extension headers may be reordered by a normalization engine operable within the traversing device so as to make the ordering compliant with the order specified by RFC 2460. Such pre-processing may make downstream processing by the traversing device more efficient (e.g., allow security checks relating to the extension headers to be performed sequentially or to take into consideration dependencies based on the order) and/or may facilitate processing by the destination node. Normalization may be performed for all or a subset of extension headers (e.g., only known or a list of identified extension headers). Alternatively, a network administrator may specify an order of extension headers that deviates from that specified by RFC 2460 or may permit extension headers to appear in an arbitrary order.

At block 420, one or more predefined and/or configurable extension header security checks are performed by an IPv6 extension header security engine of the traversing device. The security checks may include checks to protect the traversing device or downstream nodes, such as the intended recipient, against fuzzing attacks, overflow attacks and/or information smuggling.

According to one embodiment, one or more security checks may be implemented so as to limit the number of extension headers within a packet or fragment to a predefined or configurable number based on one or more of the application and/or protocol associated with the packet or fragment at issue. In one embodiment, content filtering/inspection may also be performed on the extension headers.

In one embodiment, a list of all or a subset of extension headers may be provided in the form of an access control list, for example, in which various sets of extension headers or individual extension headers (e.g., encryption mandatory header) are listed with a preset and/or configurable directive for the traversing device to allow or deny the corresponding extension header(s). For example, a network administrator may desire to block, remove or allow and content filter certain extension headers, such as encryption mandatory headers, which might otherwise be used for data or information smuggling or as a botnet control channel. Unknown extension headers may be handled in a similar manner.

At block 430, appropriate countermeasures are performed by a countermeasures engine of the traversing device. In one embodiment a mapping of countermeasures to security check violations may be maintained within the traversing device. For example, if the countermeasure for the violated security check is to block the packet, then the packet is dropped. Alternatively, if the countermeasure for the violated security check is removal of the extension headers or some subset thereof, then the header is modified to exclude the identified extension headers and the packet may be allowed to pass. The examples of countermeasures described herein are not intended to be limiting as those of ordinary skill in the art will appreciate various other countermeasures may be appropriate for particular circumstances. For example, in one embodiment, specific types of security check violations may trigger one or more of (i) sending the packet in question to an IPS for deeper inspection; (ii) logging information regarding the packet for subsequent analysis; (iii) alerting the network administrator; (iv) sending an ICMPv6 error code back to the sender of the packet at issue; (v) modifying the existing extension headers of the packet to bring them into conformity, for example; (vi) inserting additional extension headers into the packet; and (vii) generating and/or updating reputation information regarding the source of the packet in relation to IPv6 extension header conformity issues and/or perceived misuse.

While embodiments of the invention have been illustrated and described, it will be clear that the invention is not limited to these embodiments only. Numerous modifications, changes, variations, substitutions, and equivalents will be apparent to those skilled in the art, without departing from the spirit and scope of the invention, as described in the claims.

What is claimed is:

1. A method comprising:
   maintaining, by a unified threat management (UTM) device associated with a protected network, sender reputation information for each of a plurality of Internet Protocol (IP) addresses observed by the UTM device to be a sender of IP version 6 (IPv6) packets or IPv6 packet fragments, wherein the sender reputation information is indicative of proper use or misuse of IPv6 extension headers by the plurality of source IP addresses; and
   receiving, by the UTM device, an IPv6 packet or IPv6 packet fragment from a particular source IP address of the plurality of IP addresses;
   applying, by the UTM device, a set of security checks to extension headers contained within the IPv6 packet or IPv6 packet fragment, wherein the set of security checks includes at least one security check relating to a limit on a number of extension headers that may be included within the IPv6 packet or the IPv6 packet fragment based on an application or protocol with which the IPv6 packet or IPv6 packet fragment is associated;
   based on results of the set of security checks, indicating conformity or non-conformity of the extension headers with one or more security checks of the set of security checks, updating, by the UTM device, the sender reputation information for the particular source IP address; and
   based on the sender reputation information for the particular source IP address, dropping, rate limiting or quarantining, by the UTM device, the IPv6 packet or IPv6 packet fragment.

2. The method of claim 1, further comprising responsive to a violation of a security check of the set of security checks, sending, by the UTM device, the IPv6 packet or IPv6 packet fragment to an Intrusion Prevention System (IPS) within the protected network for deeper inspection to potentially reveal a Denial of Service (DoS) or a Distributed DoS (DDoS) attack.

3. The method of claim 1, further comprising responsive to a violation of a security check of the set of security checks, logging, by the UTM device, information regarding the IPv6 packet or IPv6 packet fragment for subsequent analysis.

4. The method of claim 1, further comprising responsive to a violation of a security check of the set of security checks, alerting, by the UTM device, an administrator of the protected network.

5. The method of claim 1, further comprising responsive to a violation of a security check of the set of security checks, returning an error message, by the UTM device, to a sending device associated with the IPv6 packet or IPv6 packet fragment via an error-reporting protocol.

6. The method of claim 1, further comprising responsive to a violation of a security check of the set of security checks, modifying, by the UTM device, the extension headers of the IPv6 packet or IPv6 packet fragment to bring the extension headers into conformity with the security check.

7. The method of claim 1, wherein a security check of the set of security checks restricts certain types of extension headers that may be included within IPv6 packets or IPv6 packet fragments.

8. The method of claim 7, wherein the certain types of extension headers comprise those requesting encryption.

9. The method of claim 7, wherein the certain types of extension headers comprise unknown extension headers.

10. A non-transitory computer-readable storage medium embodying a set of instructions, which when executed by one or more processors of a unified threat management (UTM) device associated with a protected network, cause the one or more processors to perform a method comprising:
   maintaining sender reputation information for each of a plurality of Internet Protocol (IP) addresses observed by the UTM device to be a sender of IP version 6 (IPv6) packets or IPv6 packet fragments, wherein the sender reputation information is indicative of proper use or misuse of IPv6 extension headers by the plurality of source IP addresses; and
   receiving an IPv6 packet or IPv6 packet fragment from a particular source IP address of the plurality of IP addresses;
   applying a set of security checks to extension headers contained within the IPv6 packet or IPv6 packet fragment, wherein the set of security checks includes at least one security check relating to a limit on a number of extension headers that may be included within the IPv6 packet or the IPv6 packet fragment based on an application or protocol with which the IPv6 packet or IPv6 packet fragment is associated;
   based on results of the set of security checks, indicating conformity or non-conformity of the extension headers with one or more security checks of the set of security checks, updating the sender reputation information for the particular source IP address; and based on the sender reputation information for the particular source IP address, dropping, rate limiting or quarantining the IPv6 packet or IPv6 packet fragment.

11. The non-transitory computer-readable storage medium of claim 10, wherein the method further comprises responsive to a violation of a security check of the set of security checks, sending the IPv6 packet or IPv6 packet fragment to an Intrusion Prevention System (IPS) within the protected network for deeper inspection to potentially reveal a Denial of Service (DoS) or a Distributed DoS (DDoS) attack.

12. The non-transitory computer-readable storage medium of claim 10, wherein the method further comprises responsive to a violation of a security check of the set of security checks, logging information regarding the IPv6 packet or IPv6 packet fragment for subsequent analysis.

13. The non-transitory computer-readable storage medium of claim 10, wherein the method further comprises responsive to a violation of a security check of the set of security checks, alerting an administrator of the protected network.

14. The non-transitory computer-readable storage medium of claim 10, wherein the method further comprises responsive to a violation of a security check of the set of security checks, returning an error message to a sending device associated with the IPv6 packet or IPv6 packet fragment via an error-reporting protocol.

15. The non-transitory computer-readable storage medium of claim 10, wherein the method further comprises responsive to a violation of a security check of the set of security checks, modifying the extension headers of the IPv6 packet or IPv6 packet fragment to bring the extension headers into conformity with the security check.

16. The non-transitory computer-readable storage medium of claim 10, wherein a security check of the set of security checks restricts certain types of extension headers that may be included within IPv6 packets or IPv6 packet fragments.

17. The non-transitory computer-readable storage medium of claim 16, wherein the certain types of extension headers comprise those requesting encryption.

18. The non-transitory computer-readable storage medium of claim 16, wherein the certain types of extension headers comprise unknown extension headers.

* * * * *